Patented Sept. 17, 1946

2,407,896

UNITED STATES PATENT OFFICE 2,407,896

METHOD OF RECOVERING THE SALT-FORMING COMPONENTS OF NYLON

Clovis D. Myers, Ardentown, Del., assignor to E. I. du Pont de Nemours & Company, Wilmington, Del., a corporation of Delaware No Drawing. Application June 29, 1943, Serial No. 492,716

7 Claims. (Cl. 260—78)

This invention relates to a method of recovering, for reuse, the components from which synthetic linear condensation products are made. More particularly, the invention relates to a process of recovering, for reuse, of the salt-forming components from which nylon is made.

For convenience, the invention will be described in terms of polyhexamethylene adipamide, which is the common nylon on the market, although it will be understood that the invention is applicable to the related linear superpolyamides and interpolyamides.

Normal operation of a nylon plant results in the unavoidable collection of waste material at different points in the process. Economic operation suggests that this expensive material be reworked into useful form. Moreover, there is today a great shortage of nylon and the raw materials from which it is made, so that it is advisable to rework even worn fabrics into useful materials. Attempts to accomplish this by a partial depolymerization and re-polymerization has resulted in only limited applicability. Such process can only be used for the reworking of quite pure nylon waste of definitely known history and is, therefore, not a practical solution to the present-day problem.

It is an object of this invention to provide a practical method for isolating and quantitatively recovering in the pure state, from nylon waste, the salt-forming components from which the nylon was made. It is a further object to provide a process for recovering these raw materials from any source of nylon waste, whether dyed or undyed or mixed with other materials, such as cotton, silk, wool, linen, etc. Other objects will appear hereinafter.

The objects of the invention are accomplished, in general, by hydrolyzing the nylon with strong acids and repeatedly removing the acid components of the nylon salt. The following examples, in which percentages are by weight, illustrate methods of recovering the salt-forming components from which the nylon under treatment was originally made in accordance with this invention.

Example I

A lot of dyed waste polyhexamethylene adipamide in the form of used stockings which had been thoroughly washed, dried and graded to contain less than 4% of extraneous fiber was treated with sulfuric acid in water in the ratio of 1:1:1 at 115° C. to 120° C. under gentle reflux for 5 hours. The hydrolysis mixture was cooled and the solid adipic acid, which separated on cooling, was removed by filtering in a vacuum nutsche using a glass filter cloth. The filtrate was hydrolyzed for a second 5-hour period and, after cooling, the adipic acid was again removed. The filtrate containing sulfuric acid, the diamine sulfate, and small dissolved quantities of adipic acid were slowly added to a slurry of lime in water (1:7) maintained at a temperature of 70° C. to neutralize the sulfuric acid and to obtain a water solution containing free diamine. The solid calcium sulfate and unreacted lime were removed by filtration. The calcium sulfate cake was re-slurried with water two or three times and the washings added to the main solution. The diamine was obtained in a pure state by first distilling water from the solution at atmospheric pressure and then distilling the diamine under 35 mms. pressure at a temperature of 108° C. The adipic acid was purified by treatment with decolorizing carbon and by two crystallizations in water. The hexamethylene diamine and the adipic acid recovered by the process proved to be entirely pure and acceptable for making new nylon products which compared favorably with those made from the original raw material.

Example II

A batch of nylon waste containing a blend of dyed polyhexamethylene adipamide stocking waste, undyed polyhexamethylene adipamide woven fabric and polyhexamethylene adipamide scrap flake and containing about 4% cellulose in the form of rayon was thoroughly washed, dried and hydrolyzed as in Example I for 5 hours. The hydrolysis mixture was cooled and the solid adipic acid, together with the cellulose, was removed by centrifuging. The hydrolysis procedure was repeated for two cycles of 5 hours each, with the removal of adipic acid by centrifuging after each operation. The filtrate was neutralized with lime as in Example I, care being taken that the agitation and rate of addition were such that the temperature did not exceed 90° C. The solid calcium sulfate and unreacted lime were separated by centrifuging.

The diamine was recovered from the filtrate by distillation as in Example I. A small amount of sodium hydroxide was added to the still pot during the charging to permit the recovery of diamine carbonate as diamine. After the water was removed, the diamine was distilled over at a pressure of 30 mms. and was caught in distilled water.

The crude adipic acid cakes were purified by dissolving in 85° C. water, treating with decolorizing carbon, filtering hot, and recrystallizing. The crystals were washed free of mother liquor by restricted water washing. Both the hexamethylene diamine and the adipic acid so recovered were found to be entirely satisfactory for use in the manufacture of nylon.

The steps of hydrolyzing, cooling, in a heat exchanger, the hydrolysis mixture, filtering the mixture to remove the adipic acid, and returning the filtrate to the hydrolyzer for further hydrolysis can be continuous in operation until the adipic acid is substantially removed, as hereinbefore described.

In the examples, preference has been shown for a plurality of hydrolysis steps of 5 hours each. The invention importantly depends on the discovery that the process will proceed satisfactorily only if the adipic acid is removed from the hydrolysis mixture a plurality of times; for example, a 10- or 15-hour single hydrolysis step is not the equivalent of two 5-hour or three 5-hour digestions, with removal of adipic acid between the steps. In the former cases, the percentage recovery of adipic acid and hexamethylene diamine is quite low, whereas, in the latter preferred cases, it is substantially quantitative. It is not fully understood why this is critical.

It will be understood, of course, that the essence of the invention comprises a plurality of hydrolysis steps and a corresponding number of adipic acid removals and that the number of treatments and the length of them are not critical within limits; for example, each digestion may proceed as long as 10 or more hours, if desired, or as little as 3 hours. This is dependent in part on the concentrations of waste yarn in the mixture, the concentration of sulfuric acid and the hydrolyzing temperature. Generally, concentrations of sulfuric acid of about 50% are preferred, but equally good results are secured within the range of 30% to 70%. Similarly, a temperature of about 120° C. is preferred. but temperatures within the range of 75° C. to 140° C. are fairly operative.

While preference is had for the use of sulfuric acid, in view of its cost and its ease of removal as insoluble salts, the spirit of the invention includes other strong mineral acids, such as hydrochloric and phosphoric acids. Similarly, lime is a known convenient agent for neutralizing the spent acid but it is merely illustrative of known agents, including caustic soda, soda ash and barium hydroxide.

In the examples, the nylon waste has been graded to include not more than 4% of extraneous fiber, such as cotton or regenerated cellulose. It has been found that, when the quantity of such extraneous fiber exceeds 6%, difficulties of handling and filtration occur. While the process is operative, it is usually better to lower the extraneous fiber by grading.

As a matter of convenience, the invention has been described in terms of the hydrolysis of polyhexamethylene adipamide yarn, since that is the common nylon of the market. The invention is, however, not restricted to this specific polymer, since it will be obvious to those skilled in the art that the process will work equally well with related polyamides and with suitable modifications with related polymer yarns.

The invention, in general, can be used with any hydrolyzable linear condensation polymer waste to obtain the monomolecular components thereof, and such components can be used in reconstructing the polymer. Polyamides of the diamine dibasic acid type, described in the Carothers Patents Nos. 2,130,523 and 2,130,948, may be treated according to this invention to obtain the salt-forming components, i. e. the dibasic acid and the diamine and the polyamide reconstructed therefrom. The process of this invention can be used to treat polyamides of the amino acid type, described in the Carothers Patent No. 2,071,253, to obtain the amino acid. The principles of this invention can be applied to linear condensation products of the type formed by reacting a diprimary diamine of radical length at least 4 and a polycarboxylic acid which is a tricarboxylic acid or a tetracarboxylic acid, the tricarboxylic acid having at least one pair of carboxyl groups attached to adjacent carbon atoms, and the tetracarboxylic acid having two and only two pairs of carboxylic acid groups attached to adjacent carbon atoms, as described in copending application Serial No. 456,383, for the purpose of recovery of the acid which is employed in the preparation of the condensation product. Likewise, a polyester of the type described in the Carothers Patent No. 2,071,250 can be treated according to this invention to obtain the ester-forming components thereof. Similarly, the process will be found advantageous in the handling of interpolymers, such as interpolyamides, even without separation of the individual diamines and individual dibasic acids for the reason that frequently it is desired to reconstruct the same interpolyamides.

It is readily admitted that the cost of producing nylon by starting with waste nylon yarn, hydrolyzing it to the components of the original salt and reconstructing the polymer and spinning into yarn is more expensive than starting with the components of the salt in the first place. However, in the present economic cycle, any step which can be taken to increase the quantity of nylon or nylon yarn available is important. Moreover, in a more ordinary economy, there will be an accumulation of nylon waste products of such diverse characteristics that they cannot be reworked and reused by a simple physical method.

By reason of this invention, a truly commercial process is now available for the production from waste nylon products of the components of the original salt from which the polymer was made. These materials are recovered in as pure form as they would be made synthetically and they are recoverable on a commercial basis in quantities of about 90% of that which is theoretically possible. The process of recovering these materials in nowise interferes with the orderly manufacture of nylon and it involves the use of relatively simple equipment.

In the claims the term "mass" is meant to cover the material which is originally subjected to the first hydrolyzing treatment and the liquid remaining after a hydrolysis and removal of the dibasic acid therefrom.

Since it is obvious that many changes and modifications can be made in the above-described details without departing from the nature and spirit of the invention, it is to be understood that the invention is not to be limited thereto except as set forth in the appended claims.

I claim:

1. A process of recovering adipic acid and hexamethylene diamine suitable for reuse from polymeric hexamethylene adipamide waste, which comprises repeatedly hydrolyzing a mass containing the said adipamide with a mineral acid, and removing the adipic acid from the hydrolyzed mixture of each hydrolyzing step.

2. A process of recovering adipic acid and hexamethylene diamine suitable for reuse from polymeric hexamethylene adipamide yarn, which comprises repeatedly and in sequence hydrolyzing a mass containing the said adipamide with a mineral acid at a temperature of approximately 75° C. to 140° C., cooling the resulting hydrolyzed mixture of each hydrolyzing step, and removing the adipic acid therefrom.

3. A process of recovering adipic acid and hexamethylene diamine suitable for reuse from polymeric hexamethylene adipamide yarn, which comprises repeatedly and in sequence hydrolyzing a mass containing the said adipamide with sulfuric acid of a concentration of approximately 50% at a temperature of approximately 115° C. to 120° C., cooling the resulting hydrolyzed mixture of each hydrolyzing step, and removing the adipic acid therefrom.

4. A process of recovering adipic acid and hexamethylene diamine suitable for reuse from polymeric hexamethylene adipamide yarn by hydrolysis, which comprises repeatedly hydrolyzing a mass of said adipamide with a mineral acid, removing the adipic acid from the hydrolyzed mixture of each hydrolyzing step, thereafter neutralizing the mineral acid in the solution remaining after the last removal of the adipic acid, and separating the hexamethylene diamine therefrom.

5. A process of recovering adipic acid and hexamethylene diamine suitable for reuse from polymeric hexamethylene adipamide yarn by hydrolysis, which comprises repeatedly hydrolyzing a mass of said adipamide with sulfuric acid, removing the adipic acid from the hydrolyzed mixture of each hydrolyzing step, thereafter adding the solution remaining after the last removal of the adipic acid to a slurry of lime and water to neutralize said sulfuric acid and form calcium sulfate, removing said calcium sulfate, and separating the hexamethylene diamine from the resulting solution.

6. A process of recovering adipic acid and hexamethylene diamine suitable for reuse from polymeric hexamethylene adipamide yarn by hydrolysis, which comprises repeatedly hydrolyzing a mass of said adipamide with sulfuric acid, removing the adipic acid from the hydrolyzed mixture of each hydrolyzing step, thereafter adding the solution remaining after the removal of the adipic acid to a slurry of lime and water to neutralize said sulfuric acid and form calcium sulfate, the rate of adding the solution being such as not to increase the temperature of the neutralized mixture above 90° C., removing said calcium sulfate, and separating the hexamethylene diamine from the resulting solution.

7. A process of recovering adipic acid and hexamethylene diamine suitable for reuse from polymeric hexamethylene adipamide yarn by hydrolysis, which comprises repeatedly hydrolyzing a mass of said adipamide with sulfuric acid, removing the adipic acid from the hydrolyzed mixture of each hydrolyzing step, thereafter adding the solution remaining after the last removal of the adipic acid to a slurry of lime and water to neutralize said sulfuric acid and form calcium sulfate, removing said calcium sulfate, and separating the hexamethylene diamine from the resulting solution by first distilling off the water and then distilling off the hexamethylene diamine.

CLOVIS D. MYERS.

Certificate of Correction

Patent No. 2,407,896.

CLOVIS D. MYERS

September 17, 1946.

It is hereby certified that error appears in the printed specification of the above numbered patent requiring correction as follows: Column 6, line 15, claim 6, before the word "removal" insert *last*; and that the said Letters Patent should be read with this correction therein that the same may conform to the record of the case in the Patent Office.

Signed and sealed this 19th day of November, A. D. 1946.

[SEAL]

LESLIE FRAZER,
*First Assistant Commissioner of Patents.* taining the said adipamide with a mineral acid, and removing the adipic acid from the hydrolyzed mixture of each hydrolyzing step.

2. A process of recovering adipic acid and hexamethylene diamine suitable for reuse from polymeric hexamethylene adipamide yarn, which comprises repeatedly and in sequence hydrolyzing a mass containing the said adipamide with a mineral acid at a temperature of approximately 75° C. to 140° C., cooling the resulting hydrolyzed mixture of each hydrolyzing step, and removing the adipic acid therefrom.

3. A process of recovering adipic acid and hexamethylene diamine suitable for reuse from polymeric hexamethylene adipamide yarn, which comprises repeatedly and in sequence hydrolyzing a mass containing the said adipamide with sulfuric acid of a concentration of approximately 50% at a temperature of approximately 115° C. to 120° C., cooling the resulting hydrolyzed mixture of each hydrolyzing step, and removing the adipic acid therefrom.

4. A process of recovering adipic acid and hexamethylene diamine suitable for reuse from polymeric hexamethylene adipamide yarn by hydrolysis, which comprises repeatedly hydrolyzing a mass of said adipamide with a mineral acid, removing the adipic acid from the hydrolyzed mixture of each hydrolyzing step, thereafter neutralizing the mineral acid in the solution remaining after the last removal of the adipic acid, and separating the hexamethylene diamine therefrom.

5. A process of recovering adipic acid and hexamethylene diamine suitable for reuse from polymeric hexamethylene adipamide yarn by hydrolysis, which comprises repeatedly hydrolyzing a mass of said adipamide with sulfuric acid, removing the adipic acid from the hydrolyzed mixture of each hydrolyzing step, thereafter adding the solution remaining after the last removal of the adipic acid to a slurry of lime and water to neutralize said sulfuric acid and form calcium sulfate, removing said calcium sulfate, and separating the hexamethylene diamine from the resulting solution.

6. A process of recovering adipic acid and hexamethylene diamine suitable for reuse from polymeric hexamethylene adipamide yarn by hydrolysis, which comprises repeatedly hydrolyzing a mass of said adipamide with sulfuric acid, removing the adipic acid from the hydrolyzed mixture of each hydrolyzing step, thereafter adding the solution remaining after the removal of the adipic acid to a slurry of lime and water to neutralize said sulfuric acid and form calcium sulfate, the rate of adding the solution being such as not to increase the temperature of the neutralized mixture above 90° C., removing said calcium sulfate, and separating the hexamethylene diamine from the resulting solution.

7. A process of recovering adipic acid and hexamethylene diamine suitable for reuse from polymeric hexamethylene adipamide yarn by hydrolysis, which comprises repeatedly hydrolyzing a mass of said adipamide with sulfuric acid, removing the adipic acid from the hydrolyzed mixture of each hydrolyzing step, thereafter adding the solution remaining after the last removal of the adipic acid to a slurry of lime and water to neutralize said sulfuric acid and form calcium sulfate, removing said calcium sulfate, and separating the hexamethylene diamine from the resulting solution by first distilling off the water and then distilling off the hexamethylene diamine.

CLOVIS D. MYERS.

---

Certificate of Correction

Patent No. 2,407,896.

CLOVIS D. MYERS

September 17, 1946.

It is hereby certified that error appears in the printed specification of the above numbered patent requiring correction as follows: Column 6, line 15, claim 6, before the word "removal" insert *last*; and that the said Letters Patent should be read with this correction therein that the same may conform to the record of the case in the Patent Office.

Signed and sealed this 19th day of November, A. D. 1946.

[SEAL]

LESLIE FRAZER,
*First Assistant Commissioner of Patents.*